(12) United States Patent
Kalisz et al.

(10) Patent No.: US 12,470,104 B2
(45) Date of Patent: Nov. 11, 2025

(54) BUSBAR BASE PLATE (71) Applicant: BorgWarner Inc., Auburn Hills, MI (US)

(72) Inventors: Mariusz J. Kalisz, Noblesville, IN (US); Timothy J. Alfermann, Carmel, IN (US); Timothy J. Sailors, Jr., Carmel, IN (US)

(73) Assignee: BorgWarner Inc., Auburn Hills, MI (US)

( * ) Notice: Subject to any disclaimer, the term of this patent is extended or adjusted under 35 U.S.C. 154(b) by 364 days.

(21) Appl. No.: 17/818,704

(22) Filed: Aug. 9, 2022

(65) Prior Publication Data

US 2024/0055926 A1 Feb. 15, 2024

(51) Int. Cl.
*H02K 3/50* (2006.01)
(52) U.S. Cl.
CPC .......... *H02K 3/50* (2013.01); *H02K 2203/03* (2013.01); *H02K 2203/06* (2013.01); *H02K 2203/09* (2013.01)
(58) Field of Classification Search
CPC .. H02K 3/50; H02K 2203/03; H02K 2203/06; H02K 2203/09; H02K 13/00; H02K 2003/06
See application file for complete search history.

(56) References Cited

U.S. PATENT DOCUMENTS

| | | |
|---|---|---|
| 11,165,301 B2 | 11/2021 | Alsman et al. |
| 2021/0143698 A1 | 5/2021 | Alsman et al. |
| 2021/0194308 A1 | 6/2021 | Jones et al. |
| 2021/0344245 A1* | 11/2021 | Wittmann ............ H02K 15/12 |
| 2021/0359567 A1 | 11/2021 | Neet et al. |
| 2024/0088738 A1* | 3/2024 | Kim .................... H02K 3/38 |
| 2024/0154484 A1* | 5/2024 | Boris .................. H02K 3/28 |
| 2024/0333061 A1* | 10/2024 | Kalisz ................. H02K 3/28 |
| 2024/0405627 A1* | 12/2024 | Kamiya ............... H02K 3/50 |

* cited by examiner

Primary Examiner — Sean Kayes
(74) Attorney, Agent, or Firm — Maginot, Moore & Beck, LLP (57) ABSTRACT

A stator assembly of an electric machine includes of stator leads extending outward from one end of the stator core. A busbar assembly includes a busbar body supporting a plurality of lead connectors that are connected to corresponding stator leads. An alignment plate is interposed between the stator assembly and the busbar assembly. The alignment plate includes a rigid base plate having a planar bottom face supported on the top surface of the end turns and an opposite top face supporting the busbar body. The base plate defines a plurality of openings corresponding to the plurality of stator leads and arranged to be aligned with the stator leads. One or more of the stator leads extends through a corresponding one of the plurality of openings. Each of the openings is sized and configured for a close running fit with the stator lead or leads extending therethrough.

20 Claims, 5 Drawing Sheets

BUSBAR BASE PLATE

FIELD

This application relates to the field of electric machines, more particularly to winding arrangements and terminal connections for electric machines.

BACKGROUND

Electric machines are typically designed to meet specific operating requirements and space constraints. Examples of design features that contribute to operating performance include stator size, rotor size, type and arrangement of the windings, and any of various other design parameters as will be recognized by those of ordinary skill in the art. All operating requirements for the electric machine must be met while also meeting certain space constraints that are dependent upon the application for the electric machine. For automotive applications, space within the engine compartment is limited, and designers must be concerned with the overall diameter and length of the electric machine. Accordingly, limiting the size of an electric machine without sacrificing performance features is important.

Stators of electric machines include windings that include a plurality of winding leads (or conductors). These winding leads must be connected to electronics equipment associated with the electric machine, such as an inverter or rectifier. A typical arrangement for the winding leads is to route them in the space directly over the end turns (i.e., "over" meaning the space axially outward from the end turns but at a similar radial position).

Figure 1:
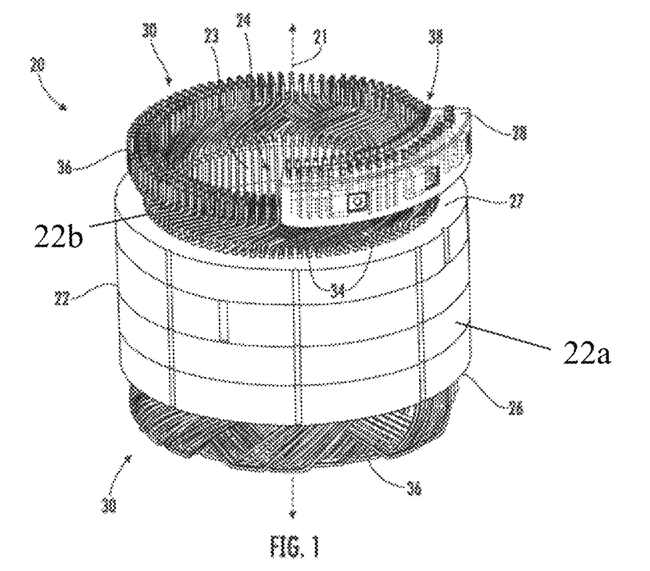
FIG. 1 is a perspective view of a stator assembly for an electric motor with a busbar assembly mounted thereon.

With reference to FIG. 1, a stator with internal connections for winding leads is disclosed. The stator 20 includes a stator core 22 with a winding arrangement 30 positioned on the stator core 22. A plurality of winding leads 38 extend from the winding arrangement 30 and a busbar assembly 28 is connected to the leads 38. The busbar assembly 28 provides various internal connections between winding leads 38. The stator core 22 is comprised of a ferromagnetic material and is typically formed from a plurality of steel sheets that are stamped and stacked upon one another to form a lamination stack, as will be recognized by those of ordinary skill in the art. As shown in FIG. 1, the stator core 22 is generally cylindrical in shape as defined by a center axis 21 and two ends 26, 27. The stator core 22 further includes an outer perimeter surface 22a defining an outer diameter of the core 22, and an inner perimeter surface 22b defining an inner diameter of the core 22.

The stator core 22 is configured to retain the winding arrangement 30 within slots 24 of the stator core 22. In at least one embodiment, the winding arrangement 30 (which may also be referred to herein as "windings") is formed from a plurality of elongated wires (e.g., copper wires) that are continuously wound within the slots 24 on the stator core 22 in order to form the windings. The conductors of the completed winding arrangement 30 form a plurality of three-phase windings (e.g., phase U windings, phase V windings, and phase W windings) with multiple winding paths for each phase (i.e., both parallel and series-connected paths within each phase). The three phase windings can be star/wye ("Y") connected or delta ("Δ") connected windings.

The conductors that form the completed windings on the stator core include in-slot portions 34, end turns 36, and winding leads 38. The in-slot portions 34 are straight portions of the conductors located within the slots 24 of the stator core 22. Each in-slot portion 34 carries current from one end 26/27 of the stator core 22 to the opposite end 27/26 of the stator core.

With continued reference to FIG. 1, the end turns 36 (which may also be referred to herein as "end loops") are the conductor portions where a change of direction occurs outside of the slots 24 at an end of the stator core 22. The end turns 36 may include bent portions and/or welded portions of the conductors. Each end turn 36 includes a conductor that exits one slot at an end of the stator core 14, is bent/twisted away from the slot (i.e., at a first angle), forms an end loop (e.g., a "U-turn" or other 180° change of direction), is bent/twisted toward a different slot (at a complementary second degree), and then enters that different slot on the same end of the stator core. As such, each end turn 36 extends between two in-slot portions 34 and across a number of slots at an end of the stator core 14. The end turns 36 are collectively represented in FIG. 1 by a conglomeration of conductors that form a disc-like shape at each end 26/27 of the stator core 22.

The winding leads 38 are conductor portions that provide an entry/exit to one of the winding paths. Each conductor forming a winding lead 38 is connected to an in-slot portion of the windings. In particular, each winding lead 38 exits a slot 24, and then extends in an axial direction away from the end turns 36 to a point where the lead 38 terminates, axially outward from the end turns 36. In other words, the leads 38 are shaped similar to half an end turn 36, wherein the lead 38 extends out of a slot and follows the same path as the other end turns, but instead of including a U-turn, the lead continues to extend in an axial direction away from the end loops. Each of the leads 38 terminates at an end of the lead that is axially distant from the end turns 36. As shown in FIG. 1 each end of the leads is joined to a busbar/conductor provided within the busbar assembly 28.

The busbar assembly 28 is mounted on the stator assembly 20 by feeding the leads 38 of the winding arrangement 30 through openings in the body of the busbar assembly. Proper alignment between the busbar assembly and the stator leads is important to facilitate the assembly of the busbar to the stator. With the leads 38 properly positioned within the busbar assembly, the leads are welded to lead connectors in the busbar assembly. The proximity of this welding operation to the winding arrangement 30 can compromise the stator leads and end turns 36. It would be desirable to provide means for ensuring proper alignment of the busbar assembly with the stator leads to facilitate assembly, and to minimize relative movement between the busbar assembly and the stator during and after assembly. It would also be desirable to provide means to prevent damage to the winding arrangement of the stator when the stator leads are being welded to the busbar connectors. While it would be desirable to provide an electric machine that provides one or more of these or other advantageous features as may be apparent to those reviewing this disclosure, the teachings disclosed herein extend to those embodiments which fall within the scope of the appended claims, regardless of whether they accomplish one or more of the above-mentioned advantages.

SUMMARY OF THE DISCLOSURE

In accordance with at least one embodiment of the disclosure, a base plate is provided as an interface between a busbar assembly and a stator assembly in an electric machine. The stator assembly includes a stator core having opposite ends and a winding arrangement positioned on the core. The winding arrangement includes a plurality of stator leads extending outward from one of the ends of the core. The busbar assembly includes a busbar body supporting a plurality of lead connectors, each of the plurality of lead connectors connected to at least one of the plurality of stator leads. In one feature of the disclosure, the alignment plate is interposed between the stator assembly and the busbar assembly. The alignment plate includes a rigid base plate having a planar bottom face supported on the top surface of the end turns and an opposite top face supporting the busbar body. A plurality of openings is defined through the base plate, in which the openings corresponding to the plurality of stator leads. The openings are arranged on the base plate to be aligned with the plurality of stator leads, with one or a pair of the stator leads extending through a corresponding one of the openings. The openings are sized and configured for a close running fit with the stator leads extending therethrough.

In another aspect of the disclosure, an alignment plate is provided for mounting a busbar assembly to a stator, in which the stator includes a winding arrangement with a plurality of stator leads projecting from a stator core, and the busbar assembly includes a busbar body carrying a plurality of lead connectors corresponding to the plurality of stator leads. The alignment plate comprises a rigid base plate having a planar bottom face configured to be seated on the end turns and an opposite top face configured to receive the busbar body mounted thereon. A plurality of openings are defined through the base plate, with the plurality of openings corresponding to the plurality of stator leads and arranged on the base plate to be aligned with and receive the plurality of stator leads when the bottom face is seated on the stator core. Each opening of the plurality of openings is sized and configured for a close running fit with a corresponding one or a corresponding pair of the stator leads aligned with the opening.

In another feature, the alignment plate can include alignment features supporting the busbar assembly on the alignment plate in proper alignment for electrical engagement between the busbar lead connections and the stator leads.

The alignment plate facilitates assembly of the busbar assembly on the stator assembly by ensuring that the busbar is properly aligned as it is placed on the stator core. The alignment plate also provides protection for the stator and the winding arrangement during the welding operation to connect the stator leads to the lead connectors.

DETAILED DESCRIPTION

Figure 2:
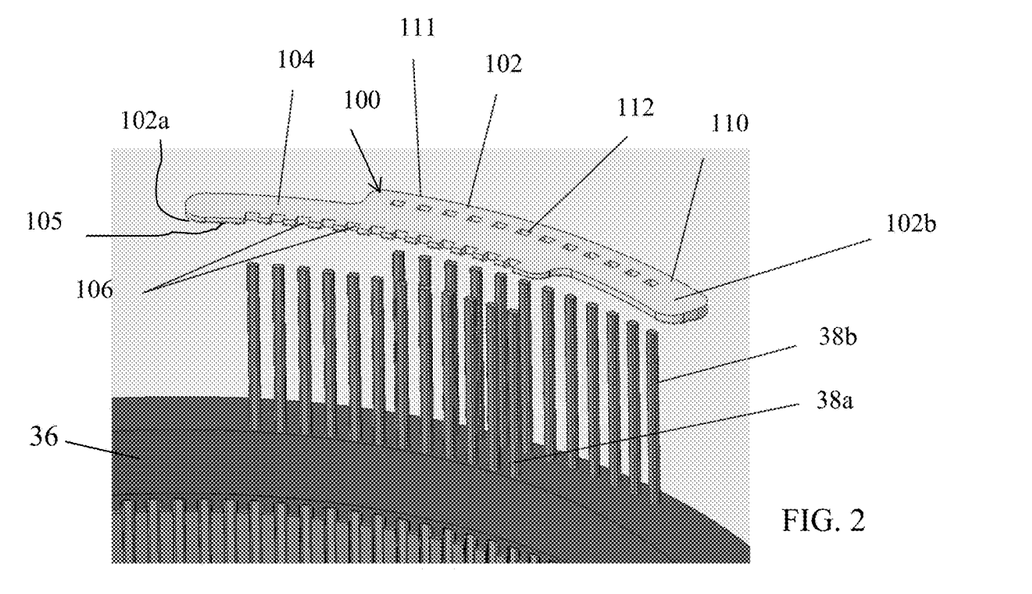
FIG. 2 is an enlarged perspective view of an alignment plate according to one embodiment of the disclosure aligned with stator leads of a stator.
Figure 3:
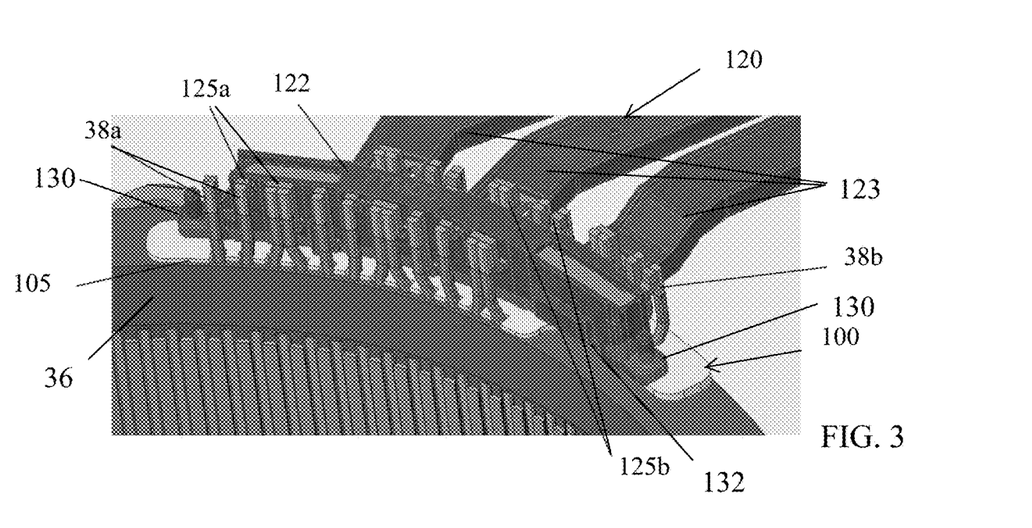
FIG. 3 is an enlarged perspective view of the alignment plate of FIG. 2 and a busbar assembly mounted on the stator core.

In accordance with the present disclosure, one embodiment of an alignment plate 100 is shown in FIGS. 2-3. The alignment plate includes a base plate 102 with a planar bottom face 102*a* configured to be supported on the top surface of the end turns 36 or on the top surface of the stator core 22, and an upper face 102*b* configured to receive a busbar assembly 120 seated thereon. The busbar assembly 120 includes a body 122 that is seated on the base plate 102, phase terminals 123 and lead connectors 125 configured to provide an electrical connection between the stator leads 38 and the phase terminals 123. The base plate may be arcuate so that the base plate is in the form of an arc segment configured to follow the curvature of the stator core, with an inboard edge 105 and an outboard edge 111 generally contiguous with or between the inner and outer perimeter surfaces 22*a*, 22*b* of the stator core, respectively. In the embodiment of FIG. 2, the alignment plate includes an inboard segment 104 and an outboard segment 110 that are circumferentially offset relative to each other. In particular, the inboard segment 104 is arranged to be aligned with the inboard stator leads 38*a*, while the outboard segment 110 is arranged to be aligned with the outboard stator leads 38*b*. It can be appreciated that the circumferential offset, if any, between the inboard and outboard segments of the base plate 122 is determined by the locations of the inboard and outboard stator leads.

Each segment defines a plurality of features to receive the stator leads therethrough. In the illustrated embodiment, the inboard segment 104 includes a plurality of notches 106 defined in the inboard edge 105 of the base plate 102. The outboard segment 110 defines a plurality of openings 112. In each case, the notches 106 and openings 112 are defined for a close running fit with corresponding stator leads 38*a*, 38*b*. In the embodiment shown in FIGS. 2-3, the leads have a rectangular cross-section, as is common in the art. The notches 106 and openings 112 also have a rectangular cross-section that is slightly larger than the cross-section of the leads so that the leads can be threaded through the notches and openings. The number of notches and openings depends on the number of stator leads 38*a*, 38*b*. In the illustrated embodiment, twelve notches and twelve openings correspond to the twelve inboard and twelve outboard stator leads, as is typical in the art.

The base plate 102 is generally rigid so that the base plate will not bend of flex as the alignment plate 100 is mounted on the stator leads. Moreover, the base plate must be non-conductive. In one specific embodiment, the base plate 102 is formed of a glass-impregnated nylon. The nylon material provides a low-friction surface within the notches 106 and openings 112 to facilitate the movement of the alignment plate over the stator leads 38*a*, 38*b*.

The alignment plate 100 facilitates the engagement of the busbar assembly 120 to the stator assembly 20. As is known in the art, the busbar assembly 120 includes a body 122 from which the phase terminals 123 project. The body 122 supports a plurality of inboard and outboard lead connectors 125a, 125b, respectively, that are connected to the phase terminals and that are connectable to the respective inboard and outboard stator leads 38a, 38b. The alignment plate serves to maintain the proper alignment between the stator leads and the lead connectors of the busbar assembly as the busbar assembly is mounted to the stator. As shown in FIG. 1, the alignment plate 100 is positioned above the ends of the stator leads, with each stator lead aligned with a corresponding notch or opening. The alignment plate is then moved downward toward the stator core 22 so that the stator leads enter the corresponding notches and openings. It can be appreciated that the presence of the notches 106 reduces the "fiddle-factor" in aligning all of the stator leads with the notches and openings. The open edge of the notches allows the notches 106 to engage the inboard stator leads 38a first, so that the openings 112 should be automatically aligned with the outboard stator leads 38b. It is contemplated that the outboard openings can be in the form of notches, like the notches 106, and that the inboard notches can be openings, like the openings 112.

The alignment plate 100 can be advanced partway down the stator leads to maintain the leads in an optimum position to accept the busbar assembly 120. The busbar assembly 120 is engaged to the alignment plate 100 with each of the lead connectors 125a, 125b in contact with a counterpart one of the stator leads 38a, 38b, as shown in FIG. 2. It can be appreciated that the body 122 of the busbar assembly can be engaged to the base plate 102 in any manner that maintains the alignment of the busbar lead connectors with the stator leads as the alignment plate 100 is advanced down the stator leads. The body of the busbar assembly can be affixed to the alignment plate, held in direct contact with the alignment plate or pushed into engagement with the base plate to push the alignment plate downward along the stator leads. It can be appreciated that the alignment plate 100 provides structural support for the stator leads as well as for the busbar assembly 120 as it is being assembled with the stator.

Once the alignment plate is pushed against the top surface of the end turns 36, the stator leads 38a, 38b and corresponding lead connectors 125a, 125b can fixed in electrically conductive contact, such as by welding the leads together. The leads can be bent as needed, as shown in FIG. 2, for proper electrical connection between stator leads and busbar lead connectors. It can be appreciated that the alignment plate helps minimize any movement of the stator leads during the welding operation. It can be also be appreciated that the alignment plate 100 protects the stator and winding arrangement 30 from the welding operation, since the plate is interposed between the stator and the welding joints.

The alignment plate 100 is sized to be supported on the top surface of the end turns 36 and to provide a top face 102b on which the busbar body 122 can be stably supported. In the illustrated embodiment, the alignment plate is sized to span twelve inboard stator leads 38a and twelve outboard stator leads 38b. Thus, the base plate 102 is curved at the radius of the stator core 22. In a specific embodiment, the alignment plate subtends a length of about 110 mm and a width of about 27.5 mm. Of course, the dimensions would be adjusted based on the dimensions of the stator on which the busbar assembly is to be mounted.

Figure 4:
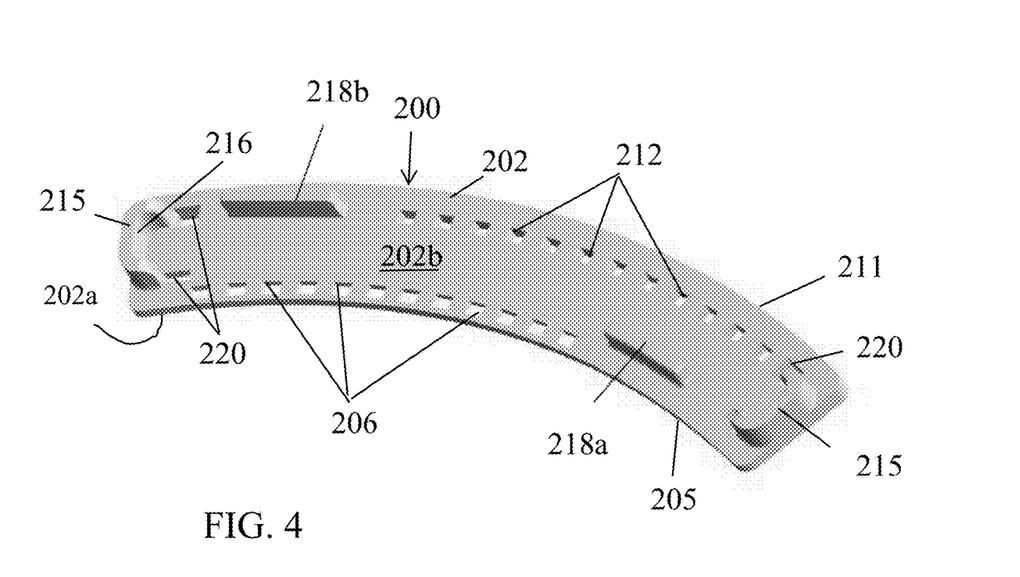
FIG. 4 is a top view of an alignment plate according to another embodiment of the disclosure.
Figure 5:
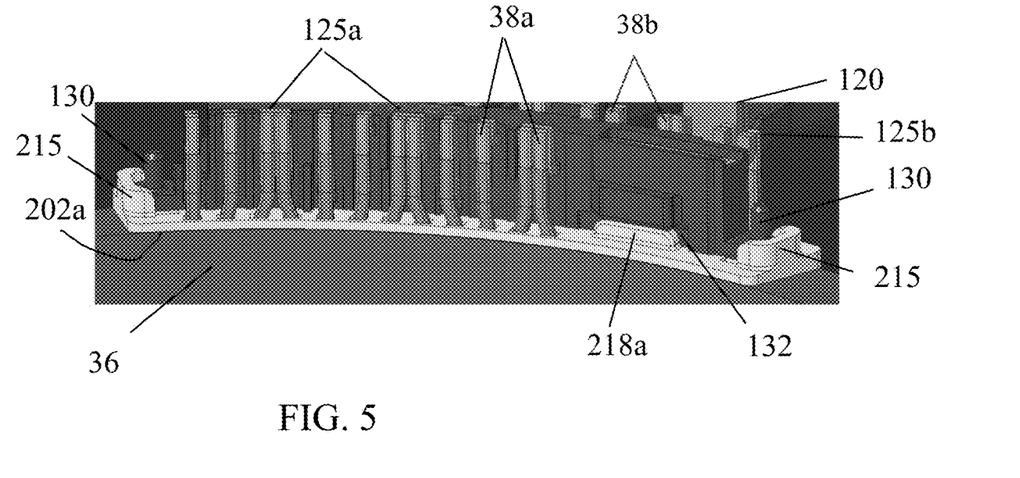
FIG. 5 is an enlarged perspective view of the alignment plate of FIG. 4 and a busbar assembly mounted on a stator core.

An alignment plate 200 in another embodiment shown in FIGS. 4-7 includes features for centering the busbar assembly on the alignment plate. As shown in FIG. 4, the alignment plate 200 includes a base plate 202 that can be formed of the same material as the base plate 102. The base plate includes an inboard edge 205 with a plurality of openings 206 defined through the plate adjacent the inboard edge. An outboard edge 222 includes an adjacent plurality of openings 212. As with the alignment plate 100, the inboard and outboard openings 206, 212 are circumferentially offset relative to each other to coincide with the respective inboard and outboard stator leads 38a, 38b. As with the openings 112, the openings 206, 212 have a cross-section that corresponds to the cross-section of the stator leads, sized for a close running fit. The base plate 202 is thus configured like the base plate 102 to simultaneously accept all of the stator leads and to be advanced down the leads until the bottom face 202a contacts the top surface of the end turns.

Figure 6:
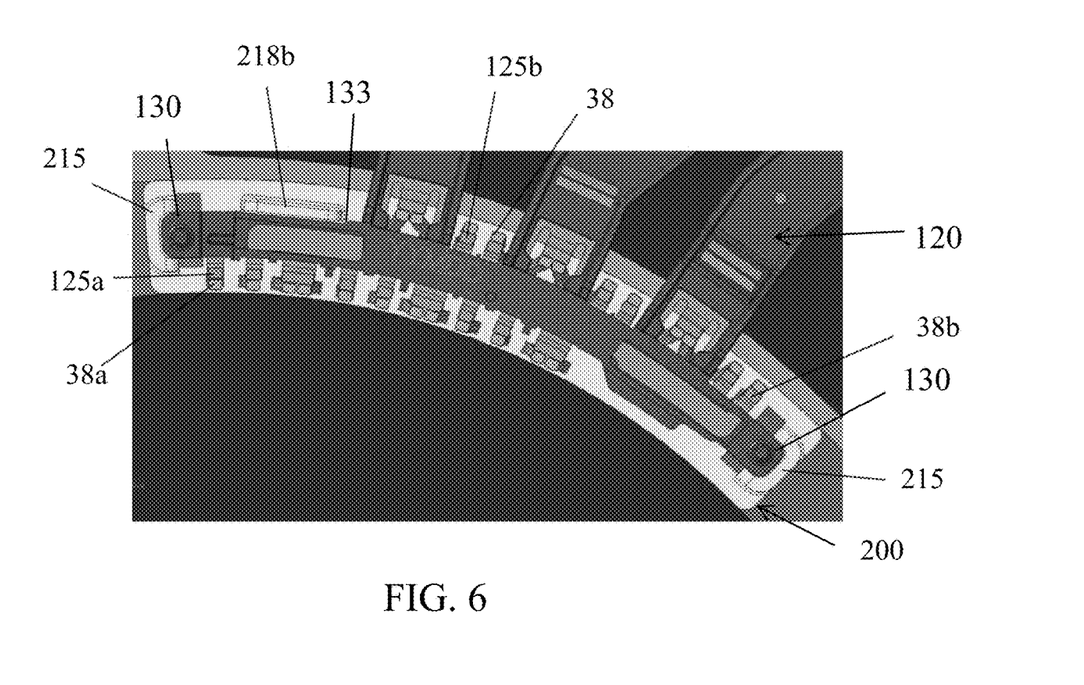
FIG. 6 is a top view of the alignment plate of FIG. 4 and the busbar assembly mounted on the stator core shown in FIG. 5.

In this embodiment, the alignment plate 200 includes four features for centering the busbar assembly 120 on the top face 202b of the base plate. In particular, the alignment plate includes upward projecting flanges 215 at the opposite ends of the base plate. The flanges 215 define recesses 216 that are sized and configured to receive bosses 130 at the opposite ends of the busbar assembly, as best seen in FIG. 6. The alignment plate further includes an inboard rib 218a adjacent the inboard edge 205 of the base plate, and an outboard rib 218b adjacent the outboard edge 211 of the base plate. The ribs 218a, 218b are radially offset from each other by a distance slightly greater than the radial width of the body 122 of the busbar assembly 120. The ribs 218a, 218b are circumferentially offset to be near the opposite ends of the busbar body and to accommodate the circumferentially offset inboard and outboard openings 206, 212. The end flanges 215 and ribs 218a, 218b cooperate to center the busbar body 122 properly on the base plate. More specifically, the flanges and ribs center the busbar body on the base plate so that the lead connectors 125a, 125b are arranged directly adjacent a corresponding one of the openings 206, 212. The busbar body can define recesses 132, 133 for receiving a corresponding rib 218a, 218b.

Figure 7:
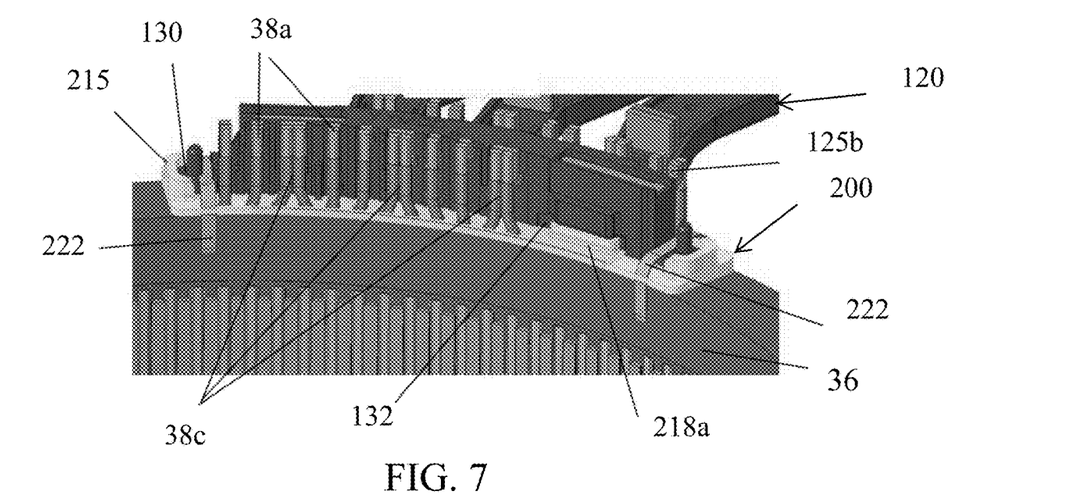
FIG. 7 is an enlarged perspective view of the alignment plate of FIG. 4 and the busbar assembly mounted on the stator core, as in FIG. 5, with a cable tie fixing the components together.

The alignment plate 200 can include a further feature for fixing the busbar assembly to the stator. In one embodiment, the base plate 202 can define one or more pairs of openings 220, preferably with a pair of openings at each end of the plate as best seen in FIGS. 4, 7. The openings are sized to receive a strap 222 as shown in FIG. 7. The strap can traverse the end bosses 130 of the busbar body 122, pass through the openings 220 on either side of the busbar body, and through an opening in the top surface of the end turns 36. The straps 222 can be conventional cable ties that can be tightened by pulling the free end of the strap. Once tightened, the straps hold the busbar body firmly on the alignment plate and end turns 36, essentially eliminating any movement of the busbar assembly, particularly during the process of welding the leads.

Figure 8:
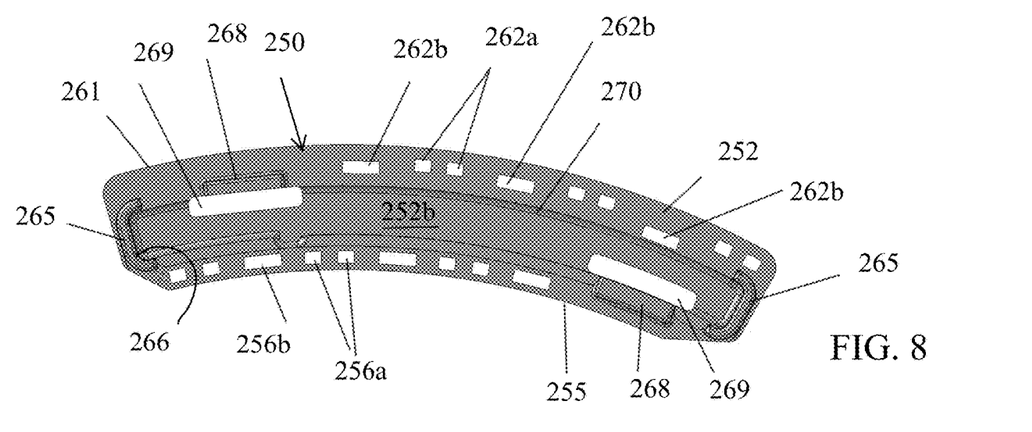
FIG. 8 is a top view of an alignment plate according to a further embodiment of the disclosure.
Figure 9:
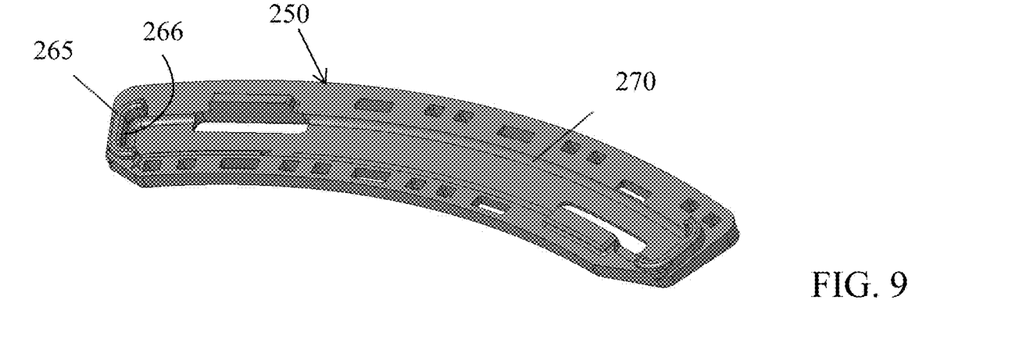
FIG. 9 is a top perspective view of the alignment plate shown in FIG. 8.
Figure 10:
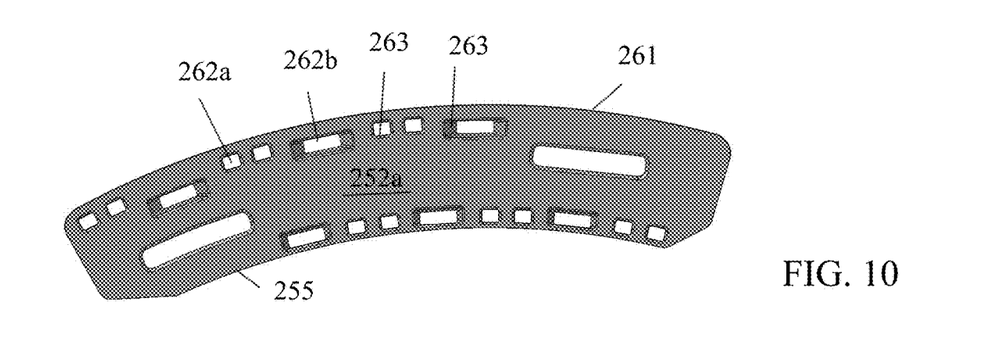
FIG. 10 is a bottom view of the alignment plate shown in FIG. 8.

An alignment plate 250 of another embodiment, shown in FIGS. 8-10, includes a base plate 252 with a planar bottom face 252a for mounting on the top surface of the end turns 36, as with the base plates of the previous embodiments. The base plate defines a plurality of openings 256a, 256b adjacent the inboard edge 255, and a plurality of openings 262a, 262b adjacent the outboard edge 261. The two sets of openings are circumferentially offset from each other and are arranged to accept the stator leads 38, as described above with respect to the other alignment plates. In this embodiment, certain openings 256a, 262a are sized to receive a single stator lead, while other openings 256b, 262b are sized to receive two stator leads. The single lead openings 256a, 262a have a cross-section like the stator lead, sized to provide a close running fit. The openings 256b, 262b are aligned with adjacent pairs of stator leads that are electrically connected to each other, such as the lead pairs 38c shown in FIG. 7. The circumferential width of the double lead openings 256b, 262b is sufficient to span the lead pairs 38c with a gap between the leads. The double lead openings 262b adjacent the outboard edge can be offset radially relative to each other and to the single lead openings 262a, depending on the arrangement of the outboard stator leads 38b.

In one feature of the alignment plate 250, the openings 256a, b and 262a, b can define a chamfer 263 at the bottom face 252a of the base plate. The chamfer can extend around the perimeter of each opening, as shown in FIG. 10. The chamfer essentially extends the size of the opening on the bottom face 252a that faces the ends of the stator leads when the alignment plate 250 is positioned above the leads. The chamfers 263 help guide the alignment plate into proper alignment on the stator leads as the plate is moved downward onto the stator leads 38a, b. Once all of the leads extend through the respective inboard and outboard openings in the base plate 252, the alignment plate is fully aligned with the leads and able to accurately guide the busbar assembly into electrical contact with the leads, as described above.

Like the alignment plate 200, the alignment plate 250 includes end flanges 265 projecting from the top face 252b of the base plate 252. The flanges define a recess 266 for receiving the end bosses 130 of the busbar assembly 120, as described above. The alignment plate 250 also includes centering ribs 268 that project upward from the top face to be received within alignment recesses 132, 133 in the busbar body 122, as described above. In this embodiment, the base plate 242 defines elongated openings 269 inboard from the centering ribs 268, as shown in FIG. 8. The openings can receive a corresponding rib (not shown) projecting from the underside of the busbar body 122 to enhance the engagement between the busbar assembly and the alignment plate 250. Likewise, the base plate 252 can define a continuous channel 270 in board of the end flanges 265 and centering ribs 268 that can receive a peripheral rib (not shown) on the underside of the busbar body, to further enhance the placement of the busbar assembly on the alignment plate.

The foregoing detailed description of one or more embodiments of the interior bus bar for an electric machine has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

Various embodiments are presented in the drawings and in the accompanying description. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

What is claimed is:

1. An alignment plate for mounting a busbar assembly to a stator, the stator including a winding arrangement with a plurality of stator leads projecting from a stator core and a plurality of end turns at a top surface of the stator core, wherein the stator core is cylindrical with an inner perimeter surface and an outer perimeter surface, the busbar assembly including a busbar body carrying a plurality of lead connectors corresponding to the plurality of stator leads, the alignment plate comprising:
   a rigid base plate having a planar bottom face configured to be seated on the end turns and an opposite top face configured to receive the busbar body mounted thereon, wherein said rigid base plate is arcuate with an inboard edge and an opposite outboard edge that are generally contiguous with or between the inner and outer perimeter surfaces, respectively, when the base plate is seated on the end turns; and
   a plurality of openings defined through said base plate, said plurality of openings corresponding to said plurality of stator leads and arranged on said base plate to be aligned with and receive the plurality of stator leads when the bottom face is seated on the end turns, each opening of said plurality of openings sized and configured for a close running fit with a corresponding one or a corresponding pair of said stator leads aligned with said opening.

2. The alignment plate of claim 1, wherein the base plate is formed of a glass- impregnated nylon.

3. The alignment plate of claim 1, wherein each of said plurality of openings includes a chamfer defined at said bottom face of said base plate.

4. The alignment plate of claim 1, wherein said plurality of openings includes a first plurality of openings adjacent said inboard edge and a second plurality of openings adjacent said outboard edge.

5. The alignment plate of claim 4, wherein said first and second plurality of openings each include twelve (12) openings.

6. The alignment plate of claim 4, wherein at least one of said first plurality of openings and said second plurality of openings is a plurality of notches defined in the respective inboard edge and outboard edge.

7. The alignment plate of claim 4, wherein said first and second plurality of openings are circumferentially offset from each other along the arcuate base plate.

8. The alignment plate of claim 7, wherein the base plate includes at least one rib projecting upward from said top face adjacent one of the inboard edge and the outboard edge.

9. The alignment plate of claim 8, wherein said at least one rib includes an inboard rib adjacent the inboard edge and an outboard rib adjacent the outboard edge circumferentially offset from said inboard rib.

10. The alignment plate of claim 1, wherein said base plate includes:
   opposite ends between said inboard and outboard edges; and a flange projecting from said top face at each of said opposite ends, said flange defining a recess for receiving opposite ends of the busbar body.

11. The alignment plate of claim 1, wherein said base plate includes:
opposite ends between said inboard and outboard edges; and
said base plate defines a pair of radially offset openings adjacent each of said opposite ends, each of said pair of radially offset openings configured to receive a cable tie passing therethrough.

12. An electric machine comprising:
a stator assembly including a stator core having opposite ends and a winding arrangement positioned on the core, the winding arrangement including a plurality of stator leads extending outward from one of the ends of the core and a plurality of end turns at said one of the ends of the core, wherein said stator core is cylindrical with an inner perimeter surface and an outer perimeter surface, said stator leads including a first plurality of stator leads adjacent said inner perimeter surface and a second plurality of stator leads adjacent said outer perimeter surface;
a busbar assembly including a busbar body supporting a plurality of lead connectors, each of the plurality of lead connectors connected to at least one of said plurality of stator leads; and
an alignment plate interposed between said stator assembly and said busbar assembly, said alignment plate including;
a rigid base plate having a planar bottom face supported on the end turns and an opposite top face supporting the busbar body, said rigid base plate including an inboard edge and an outboard edge; and
a plurality of openings defined through said base plate, said plurality of openings corresponding to said plurality of stator leads and arranged on said base plate to be aligned with the plurality of stator leads, one or more of the stator leads extending through a corresponding one of said plurality of openings, wherein each of said corresponding one of said plurality of openings is sized and configured for a close running fit with said one or more stator leads extending therethrough, wherein said plurality of openings includes a first plurality of openings adjacent said inboard edge and a second plurality of openings adjacent said outboard edged, said first plurality of openings receiving said first plurality of stator leads and said second plurality of openings receiving said second plurality of stator leads.

13. The electric machine of claim 12, wherein the base plate is formed of a glass-impregnated nylon.

14. The electric machine of claim 12, wherein:
said rigid base plate is arcuate with said inboard edge opposite said outboard edge, wherein said inboard edge and outboard edge are generally contiguous with or between the inner and outer perimeter surfaces, respectively.

15. The electric machine of claim 12, wherein:
the base plate includes at least one rib projecting upward from said top face adjacent one of the inboard edge and the outboard edge; and
said busbar body defines at least one recess to receive said at least one rib.

16. The electric machine of claim 12, wherein:
said base plate includes:
opposite ends between said inboard and outboard edges; and
a flange projecting from said top face at each of said opposite ends, said flange defining a recess, and
opposite ends of the busbar body are received in said recess of said flange at each of said opposite ends.

17. The electric machine of claim 12, wherein:
the base plate includes opposite ends in contact with opposite ends of the busbar body, said base plate defining a pair of openings adjacent each of said opposite ends, each of said pair of openings configured to receive a cable tie passing therethrough; and
a cable tie is wrapped around each opposite end of the busbar body, passes through the pair of openings at each opposite end of the base plate and is engaged to the stator core.

18. An alignment plate for mounting a busbar assembly to a stator, the stator including a winding arrangement with a plurality of stator leads projecting from a stator core and a plurality of end turns at a top surface of the stator core, the stator core being cylindrical in form and including an inner perimeter surface and an outer perimeter surface, the busbar assembly including a busbar body carrying a plurality of lead connectors corresponding to the plurality of stator leads, the alignment plate comprising:
a rigid base plate having a planar bottom face configured to be seated on the end turns and an opposite top face configured to receive the busbar body mounted thereon, wherein said base plate is arcuate and configured to follow a curvature of the stator core along an arc segment of less than 180°; and
a plurality of openings defined through said base plate, said plurality of openings corresponding to said plurality of stator leads and arranged on said base plate to be aligned with and receive the plurality of stator leads when the bottom face is seated on the end turns, each opening of said plurality of openings sized and configured for a close running fit with a corresponding one or a corresponding pair of said stator leads aligned with said opening.

19. The alignment plate of claim 18, wherein the base plate is formed of a glass- impregnated nylon, and wherein each of said plurality of openings includes a chamfer defined at said bottom face of said base plate.

20. The alignment plate of claim 18, wherein said rigid base plate includes an inboard edge and an opposite outboard edge that are generally contiguous with or between the inner and outer perimeter surfaces, respectively, when the base plate is seated on the end turns.

* * * * *